Patented Aug. 29, 1939

2,170,956

UNITED STATES PATENT OFFICE 2,170,956

METHOD FOR REFINING ROSIN

Byron M. Vanderbilt, Terre Haute, Ind., assignor to Commercial Solvents Corporation, Terre Haute, Ind., a corporation of Maryland No Drawing. Application June 14, 1937, Serial No. 148,110

15 Claims. (Cl. 260—107)

My invention relates to an improved process for refining rosin and, more especially, for removing impurities from low grade rosin by means of nitroparaffins.

Rosin is known to comprise essentially abietic acid with minor amounts of impurities such as color bodies, other resins, etc. The lower grades of rosin contain substantial amounts of these color bodies, both of the type which impart color to the initial rosin and of the latent type which tend to produce color on aging, particularly in the presence of oxygen and in alkaline reaction. Such latent color bodies are found to a small extent in certain low grades of gum rosin and generally in wood rosin, and constitute a serious disadvantage from the standpoint of utilizing such rosins in soaps, limed varnishes, paper sizes, or the like. Similarly, the color bodies which impart initial color to the rosins decrease their value for many industrial purposes. Other non-abietic acid materials present in crude rosins similarly decrease their value.

It has been previously been known that the above impurities including both types of the color bodies discussed above can be removed from the low grade rosins by treating a solution of the rosin in an organic solvent with a solvent for the impurities present therein. However, the solvents previously employed for this purpose have usually been disadvantageous from one standpoint or another, and up to the present time there has not been available a single type of solvent having all of the desired properties for this purpose.

I have now discovered that the nitroparaffins are particularly advantageous solvents for the extraction of impurities from low grade rosins. These compounds have an excellent selective solvent power for the non-abietic acid materials and color bodies, are chemically stable, and are easily recoverable from the extracted material. These compounds, and particularly the low molecular weight nitroparaffins, are especially advantageous in their properties with regard to immiscibility with petroleum hydrocarbon rosin solvents. Other advantages arising from the use of these compounds will be apparent from the following description.

My process comprises, briefly, subjecting to the action of the nitroparaffin a solution of rosin in a solvent capable of immiscibility with said nitroparaffin. In the preferred modification of my process, a nitroparaffin and a rosin solvent are chosen which will be miscible at the extraction temperature, and immiscible at a practically obtainable lower temperature. In this case the rosin, rosin solvent, and nitroparaffin are mixed, and heated if necessary to secure miscibility, then cooled with thorough agitation to a point substantially below the temperature of immiscibility, and the resulting liquid phases are then separated by decantation, or the like. Alternatively, a nitroparaffin and rosin solvent may be utilized which are immiscible at the desired extraction temperature, in which case the extraction is effected in a two phase system with thorough agitation, and, preferably, utilizing the countercurrent principle.

The rosin solvents which may be employed in my process may be any organic solvents for rosin which are chemically inert under the conditions of the extraction, which are capable of immiscibility with the nitroparaffin employed, and which may readily be removed from the resulting solution of refined rosin. I have found that petroleum hydrocarbon fractions, such as gasoline and naphtha, are particularly suitable for this purpose, but any other solvent meeting the above requirements may satisfactorily be used.

The nitroparaffins which are suitable for use in my process constitute any of the members of this series which may be satisfactorily removed from the resulting solution containing the rosin impurities. Since this separation will usually be effected by distillation, it is preferred to utilize the low molecular weight nitroparaffins, and particularly nitromethane and nitroethane. When employing petroleum hydrocarbon as the rosin solvents, it is also desirable to utilize at least one of the low molecular weight nitroparaffins in order to secure immiscibility at a reasonable temperature. Thus, nitromethane and naphtha are immiscible in the presence of rosin at temperatures as high as 60° C., nitroethane and naphtha are immiscible under such conditions at temperatures up to 12° C.; and the higher nitroparaffins and naphtha require refrigeration to secure immiscibility, in the case of the higher members of the series extremely low temperatures being required. I therefore prefer to use nitromethane, or a mixture of nitromethane and higher nitroparaffins when employing petroleum hydrocarbons as the rosin solvents. However, as previously pointed out, any nitroparaffin may be employed which is capable of immiscibility with the rosin solvent under practical operating conditions.

In carrying out my process, the proportion of solvents and the concentration of rosin in the solvent mixture will be largely a matter of choice depending on economic factors. I prefer, in general, to employ solvents in the approximate ratio of 2.0 milliliters nitroparaffin, and 2.5 milliliters rosin solvent per gram of rosin, but it is obvious that these proportions may be varied through a relatively wide range. By increasing the proportion of rosin solvent a larger number of separate extractions would be required, but a better yield of refined rosin would be obtained. By increasing the proportion of nitroparaffin a better grade of refined rosin should be obtainable, but at the cost of a decreased yield of such refined rosin. By increasing the amounts of both nitroparaffin and rosin solvent relative to the amount of rosin, an improved yield of a more highly refined rosin is obtainable. It is thus apparent that economic considerations will primarily control the actual proportions utilized for any given extraction.

The temperatures employed for the extraction and separation in the operation of my process will depend upon the particular solvents chosen. As previously pointed out, the extraction may be effected by heating to the point of miscibility and then cooling by agitation to secure immiscibility. It is apparent, however, that the mixture may be heated to a temperature considerably above the miscibility point as long as no losses are encountered due to decomposition, vapor losses, or the like. The separation of the two phases after extraction should be effected at the temperature giving optimum distribution of the refined rosin and color bodies. I have found that, in general, a temperature of 20° C. below the initial point of immiscibility is satisfactory for this purpose, but in any case preliminary experiments will readily determine the optimum temperature for separation. Likewise, in the case of extractions carried on entirely in a two phase system, a temperature should be chosen which will give the optimum selective solvent action.

My invention will now be illustrated by the following specific examples:

Example I

A mixture of 20 parts by weight of wood rosin FF grade having an acid number of 149.3, 38 parts by weight of naphtha (boiling range 97–123° C.), and 45 parts by weight of nitromethane was heated to 68° C. to secure miscibility, and was then cooled with agitation to approximately 48° C. At this point agitation was stopped and the material was allowed to separate into two layers, which were then separated in the usual manner. The upper layer comprised a light colored solution of the refined rosin in naphtha, and the lower layer was an extremely dark colored solution of the color bodies in the nitromethane. The solvents were then removed from both solutions by vacuum distillation leaving the refined rosin and the extract in the solid state. The refined rosin thus obtained constituted approximately 80% of the initial crude rosin, and constituted a light colored high grade rosin having an acid number of 161.4. The extract constituted a highly colored low grade rosin of acid number 128.0.

Example II

The procedure of Example I was followed, utilizing nitroethane in place of nitromethane. In this case miscibility was secured at 12° C. and the layers were separated at −8° C. The refined rosin constituted approximately 80% of the initial crude material and had an acid number of 162.7. The extract had an acid number of 128.7.

Example III

The procedure of Example I was followed, utilizing a mixture of 22 parts by weight of nitromethane, and 21 parts by weight of nitroethane in place of 45 parts by weight of nitromethane. Miscibility was secured at 47° C. and the layer separation was effected at 27° C. After separation, the upper layer constituting the naphtha solution of refined rosin was again extracted with a mixture of 22 parts nitromethane and 21 parts nitroethane. After separation of the layers and recovery of the solvents, a yield of approximately 75% of the initial low grade rosin was secured in the form of a light colored high grade material having an acid number of 165.8.

Example IV

The procedure of Example III was followed, utilizing a portion of the cycle of a batch countercurrent extraction system. The first extraction was effected with a mixture of 20 parts by weight of rosin FF grade, 38 parts by weight of naphtha, 22 parts by weight of nitromethane, and 21 parts by weight of nitroethane. Miscibility was secured at 48° C. and layer separation was effected at 28° C. The lower layer from this first extraction was then mixed with 20 parts by weight of rosin FF grade, and 38 parts by weight of naphtha to effect the second extraction. Miscibility was secured at 46° C. and layer separation was effected at 26° C. The lower layer from this second extraction constituted the final extract. The upper layer from this extraction was mixed with 20 milliliters nitromethane and 20 milliliters nitroethane to effect the third extraction. Miscibility was secured at 45° C. and layer separation was effected at 25° C. The upper layer from this third extraction constituted the final solution of the refined rosin. After evaporation of the solvents there were obtained 15 parts of light colored refined rosin having an acid number of 162.9, and 5.5 parts of highly colored low grade rosin having an acid number of 119.4.

In certain cases the nitroparaffins may be advantageously used in conjunction with certain other solvents. For example, the nitroparaffin may be used in admixture with another solvent, or it may be used in the manner disclosed above as a separate step either preceding or subsequent to a similar extraction step by means of a rosin solvent and furfural, nitroalcohol or other selective solvent for the non-abietic acid or color bodies of rosin. In following such a course of procedure, the rosin may be dissolved in, say, a petroleum hydrocarbon like naphtha, subjected to extraction with nitromethane as described in Example III, the upper layer of the extract comprising the naphtha solution of the rosin being next subjected to a second similar extraction step, with, say, furfural, or a nitroalcohol. If desired, of course, the order of these steps may be reversed.

It will be seen from the examples cited above that a high degree of purification is effected by the process of the present invention. It will be apparent, however, that the degree of purification obtainable is limited by the number of extractions made, and the proportions of solvents employed. Thus, by repeating the extractions of the above examples a more refined grade of rosin is obtainable, and the degree of purification secured will be limited only by economic considerations. In general, it may be said that a two stage extraction, or at most a three stage extraction, will give a product of sufficiently improved characteristics to warrant the expense involved.

It will be apparent that the procedure of the above examples may be modified in numerous respects. For example, other nitroparaffins and other rosin solvents may suitably be employed. Thus, various other petroleum hydrocarbon fractions may be utilized, and mixtures of nitromethane and nitropropane, or nitromethane and nitrobutane may suitably be substituted for the particular compounds or mixtures of the above examples. As has been previously pointed out, any combination of nitroparaffin and rosin solvent may be employed as long as immiscibility is obtainable under practical operating conditions. The temperatures may be varied to suit the requirements of the particular solvents, and any suitable type of apparatus may be utilized. Numerous modifications of procedure, such as the use of a continuous two phase countercurrent extraction, will be apparent to those skilled in the art. In general, it may be said that the use of any such modifications, and the use of any equivalents which would naturally occur to those skilled in the art, are included within the scope of my invention.

My invention now having been described, what I claim is:

1. In a process for the refining of rosin, the steps which comprise subjecting to the action of a nitroparaffin a solution of rosin in a solvent capable of immiscibility with said nitroparaffin, the ratio of nitroparaffin to rosin solvent being at least 20 volumes of nitroparaffin to 25 volumes of rosin solvent, forming substantially immiscible liquid phases comprising a solution of rosin in the said rosin solvent, and a solution of rosin impurities in the said nitroparaffin, and separating the said liquid phases.

2. In a process for the refining of rosin, the steps which comprise subjecting a solution of rosin in a petroleum hydrocarbon solvent to the action of a nitroparaffin capable of immiscibility with said hydrocarbon solvent, the ratio of nitroparaffin to hydrocarbon solvent being at least 20 volumes of nitroparaffin to 25 volumes of hydrocarbon solvent, forming substantially immiscible liquid phases comprising a solution of rosin in the said petroleum hydrocarbon and a solution of rosin impurities in the said nitroparaffin, and separating the said liquid phases.

3. In a process for the refining of rosin, the steps which comprise subjecting a solution of rosin in a petroleum hydrocarbon solvent to the action of a mixture of nitroparaffins capable of immiscibility with said hydrocarbon solvent, the ratio of nitroparaffin to hydrocarbon solvent being at least 20 volumes of nitroparaffin to 25 volumes of hydrocarbon solvent, forming substantially immiscible liquid phases comprising a solution of rosin in the said petroleum hydrocarbon, and a solution of rosin impurities in the said nitroparaffin mixture, and separating the said liquid phases.

4. In a process for the refining of rosin, the step which comprises subjecting a solution of rosin in a petroleum hydrocarbon solvent to the action of nitromethane in a proportion of at least 20 volumes of nitromethane to 25 volumes of hydrocarbon solvent.

5. In a process for the refining of rosin, the step which comprises subjecting a solution of rosin in a petroleum hydrocarbon solvent to the action of nitroethane in a proportion of at least 20 volumes of nitroethane to 25 volumes of hydrocarbon solvent.

6. In a process for the refining of rosin, the step which comprises subjecting a solution of rosin in a petroleum hydrocarbon solvent to the action of a mixture of nitromethane and a higher nitroparaffin in a proportion of at least 20 volumes of said nitroparaffin mixture to 25 volumes of hydrocarbon solvent.

7. In a process for the refining of rosin, the steps which comprise dissolving rosin in a solvent capable of immiscibility with a nitroparaffin, subjecting said rosin-solution to extraction with a nitroparaffin in a proportion of approximately 20 volumes of nitroparaffin to 25 volumes of rosin solvent, separating the nitroparaffin fraction from the rosin-solution, and recovering refined rosin from the said rosin-solution.

8. In a process for the refining of rosin, the steps which comprise dissolving rosin in a petroleum hydrocarbon solvent in a proportion of approximately 2.5 milliliters of hydrocarbon solvent per gram of rosin, subjecting said rosin-solution to extraction with a nitroparaffin capable of immiscibility with said hydrocarbon solvent in a proportion of approximately 2.0 milliliters of nitroparaffin per gram of rosin, separating the nitroparaffin fraction from the rosin-petroleum hydrocarbon solution, and recovering refined rosin from the petroleum hydrocarbon fraction.

9. In a process for the refining of rosin, the steps which comprise dissolving rosin in a petroleum hydrocarbon solvent in a proportion of approximately 2.5 milliliters of hydrocarbon solvent per gram of rosin, subjecting said rosin-solution to extraction with nitromethane in a proportion of approximately 2.0 milliliters of nitromethane per gram of rosin, separating said nitromethane fraction from the rosin-petroleum hydrocarbon solution, and recovering refined rosin from the petroleum hydrocarbon fraction.

10. In a process for the refining of rosin, the steps which comprise dissolving rosin in a petroleum hydrocarbon solvent in a proportion of approximately 2.5 milliliters of hydrocarbon solvent per gram of rosin, subjecting said rosin-solution to extraction with a mixture of nitromethane and a higher nitroparaffin in a proportion of approximately 2.0 milliliters of said nitroparaffin mixture per gram of rosin, separating said nitromethane and higher nitroparaffin fraction from the rosin-petroleum hydrocarbon solution, and recovering refined rosin from the petroleum hydrocarbon fraction.

11. In a process for the refining of rosin, the steps which comprise mixing a nitroparaffin with a solution of rosin in a solvent capable of immiscibility with said nitroparaffin the ratio of nitroparaffin to rosin solvent being at least 20 volumes of nitroparaffin to 25 parts of rosin solvent, heating to secure miscibility, cooling with agitation to secure immiscibility, separating the resulting liquid phases, and recovering refined rosin from the rosin solvent phase.

12. In a process for the refining of rosin, the steps which comprise mixing a solution of rosin in a petroleum hydrocarbon solvent with a nitroparaffin capable of immiscibility with said hydrocarbon solvent in a proportion of approximately 20 volumes of nitroparaffin to 25 volumes of hydrocarbon solvent, heating to secure miscibility, cooling with agitation to secure immiscibility, separating the resulting liquid phases, and recovering refined rosin from the petroleum hydrocarbon phase.

13. In a process for the refining of rosin, the steps which comprise mixing a solution of rosin in a petroleum hydrocarbon solvent with nitromethane in the approximate proportions of 2.5 milliliters of hydrocarbon solvent and 2.0 milliliters of nitromethane per gram of rosin, heating to secure miscibility, cooling with agitation to secure immiscibility, separating the resulting liquid phases, and recovering refined rosin from the petroleum hydrocarbon phase.

14. In a process for the refining of rosin, the steps which comprise mixing a solution of rosin in a petroleum hydrocarbon solvent with nitromethane and a higher nitroparaffin in the approximate proportions of 2.5 milliliters of hydrocarbon solvent and 2.0 milliliters of said nitroparaffin mixture per gram of rosin, heating to secure miscibility, cooling with agitation to secure immiscibility, separating the resulting liquid phases, and recovering the refined rosin from the petroleum hydrocarbon phase.

15. In a process for the refining of rosin, the steps which comprise subjecting a solution of rosin to extraction with a nitroparaffin and another selective solvent for the non-abietic acid and color bodies of the rosin, both of said solvents being capable of immiscibility with the said rosin solvent, the ratio of said mixed color solvent to said rosin solvent being at least 20 volumes of color solvent to 25 volumes of rosin solvent, separating the nitroparaffin and selective solvent fractions from the rosin solution and recovering refined rosin from the said rosin solution.

BYRON M. VANDERBILT.